US008655386B1

(12) United States Patent
White et al.

(10) Patent No.: US 8,655,386 B1
(45) Date of Patent: *Feb. 18, 2014

(54) PROVIDING INFORMATION TO A MOBILE DEVICE BASED ON AN EVENT AT A GEOGRAPHICAL LOCATION

(71) Applicant: Open Invention Network LLC, Durham, NC (US)

(72) Inventors: James N. White, Dallas, TX (US); Monica Rose Martino, Plano, TX (US); M. Gregory Smith, Fairview, TX (US)

(73) Assignee: Open Invention Network, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/793,909

(22) Filed: Mar. 11, 2013

Related U.S. Application Data

(63) Continuation of application No. 13/537,565, filed on Jun. 29, 2012, now Pat. No. 8,412,238, which is a continuation of application No. 12/150,413, filed on Apr. 28, 2008, now Pat. No. 8,219,110.

(51) Int. Cl.
H04W 24/00 (2009.01)

(52) U.S. Cl.
USPC ............ 455/456.3; 340/988; 340/539.13; 340/426.19; 340/8.1; 702/3; 455/404.1; 455/422.1

(58) Field of Classification Search
USPC .......... 342/357.31, 457; 455/456.1, 446, 458, 455/426.1, 410, 456.3, 404.1, 422.1; 706/12; 340/988, 989, 539.13, 8.1, 340/426.19
See application file for complete search history.

(56) References Cited

U.S. PATENT DOCUMENTS

| 6,823,263 | B1 * | 11/2004 | Kelly et al. | 702/3 |
| 7,356,344 | B2 * | 4/2008 | Sato | 455/456.3 |
| 2003/0135586 | A1 * | 7/2003 | Minborg et al. | 709/219 |
| 2004/0243422 | A1 * | 12/2004 | Weber et al. | 705/1 |
| 2005/0197775 | A1 * | 9/2005 | Smith | 702/3 |
| 2007/0136086 | A1 * | 6/2007 | Luerssen | 705/1 |
| 2008/0094256 | A1 * | 4/2008 | Koen | 340/988 |

* cited by examiner

Primary Examiner — Mahendra Patel
(74) Attorney, Agent, or Firm — Haynes and Boone, LLP

(57) ABSTRACT

A system, method, and computer readable medium for providing information to a mobile device based on an event comprising detecting an occurrence of the event, determining if the event is a specific event and if the event occurred at or near a geographical location and sending an alert of the event to at least one mobile device if the event is the specific event, if the event occurs at or near the geographical location, and if the at least one mobile device is located at or near the geographical location.

17 Claims, 8 Drawing Sheets

PROVIDING INFORMATION TO A MOBILE DEVICE BASED ON AN EVENT AT A GEOGRAPHICAL LOCATION

CROSS-REFERENCE TO RELATED APPLICATIONS

This application is a continuation of and claims priority from U.S. application Ser. No. 13/537,565 entitled PROVIDING INFORMATION TO A MOBILE DEVICE BASED ON AN EVENT AT A GEOGRAPHICAL LOCATION, filed on Jun. 29, 2012, which is a continuation of and claims priority from U.S. application Ser. No. 12/150,413 entitled PROVIDING INFORMATION TO A MOBILE DEVICE BASED ON AN EVENT AT A GEOGRAPHICAL LOCATION, filed on Apr. 28, 2008, now issued U.S. Pat. No. 8,219,110, issued on Jul. 10, 2012, the entire contents of which are incorporated by reference herein.

FIELD OF THE INVENTION

The present disclosure is generally related to a communications network, and more particularly to providing information to a mobile device based on an event at a geographical location in a communications network.

BACKGROUND OF THE INVENTION

When an event occurs in a specific location, government agencies that respond to or are responsible for the event may send out alerts to nearby entities with details about the event. In this way, others may take preventative actions against the event. For example, an accident may have occurred at a busy interchange of highways. Current transportation authorities who monitor traffic flows may send out text alerts to electronic signals positioned at various highways to alert drivers nearby. Drivers who saw the text alert may then take preventative actions against the event, for example, by taking an alternate route.

While current systems adequately alert events to people nearby, they fail to provide alerts to those who are on the move, for example, those who are not in the nearby area but are approaching the event location. This failure is due to the limitation of current systems, which provide alert information only to fixed locations, such as pre-installed electronic signals or wired telephone lines. Therefore, what is needed is ability to provide information to those who are not fixed in position, for example, mobile device users, no matter where they or their devices are geographically located.

SUMMARY OF THE INVENTION

The present disclosure describes a method for providing information to a mobile device based on an event at a geographical location. An occurrence of an event is detected. A determination is made as to whether the event is a specific event and if the event occurred at or near a geographical location. If the event is the specific event, occurs at or near the geographical location, and if the at least one mobile device is located at or near the geographical location, an alert of the event is sent to at least one mobile device.

In one embodiment, the detection of the event comprises sensing by a sensor an occurrence of an event above a predetermined threshold. Alternatively, the detection comprises capturing information about the event by at least one mobile device, sending the information to at least one service provider site, and forwarding the information to a repository.

In order to send an alert to the at least of mobile device, information about the event is first processed. An image is recognized from the information about the event, a type of the event is identified based on the image, and a location of the event is identified based on a location of the at least one mobile device.

When sending an alert of the event to at least one mobile device, in one embodiment of the present disclosure, a lookup of at least one mobile device associated with at least one service provider site is performed. The alert is then sent to the at least one mobile device associated with the at least one service provider site. In an alternative embodiment, the alert is sent to at least one service provider site. The alert is then forwarded from the at least one service provider site to at least one mobile device associated with the at least one service provider site.

In yet another embodiment of the present disclosure, a lookup of at least one mobile device associated with at least one service provider site is performed. A location of the at least one mobile device is identified. The alert is then sent to the at least one mobile device within a predetermined distance of the event based on the location.

In still yet another embodiment of the present disclosure, a location of at least one service provider site is identified from a geographical information system. The alert is sent to the at least one service provider site within a predetermined distance of the event based on the location. The alert is then forwarded from the at least one service provider site to at least one mobile device associated with the at least one service provider site.

In addition to sending alert messages based on geographical locations, the alert may be sent to the at least one mobile device based on a period of time the at least one mobile device is registered with a service provider site.

In a further embodiment of the present disclosure, a communications network for providing information to a mobile device based on an event at a geographical location is provided. The communications network comprises at least one mobile device utilized by at least one mobile user, at least one service provider site associated with the at least one mobile device; and an event alert system operable to detect an occurrence of the event, process information related to the event, and send an alert of the event to the at least one mobile device if the event is a specific event, if the event occurs at or near a geographical location, and if the at least one mobile device is located at or near the geographical location.

DETAILED DESCRIPTION OF THE INVENTION

Figure 1:
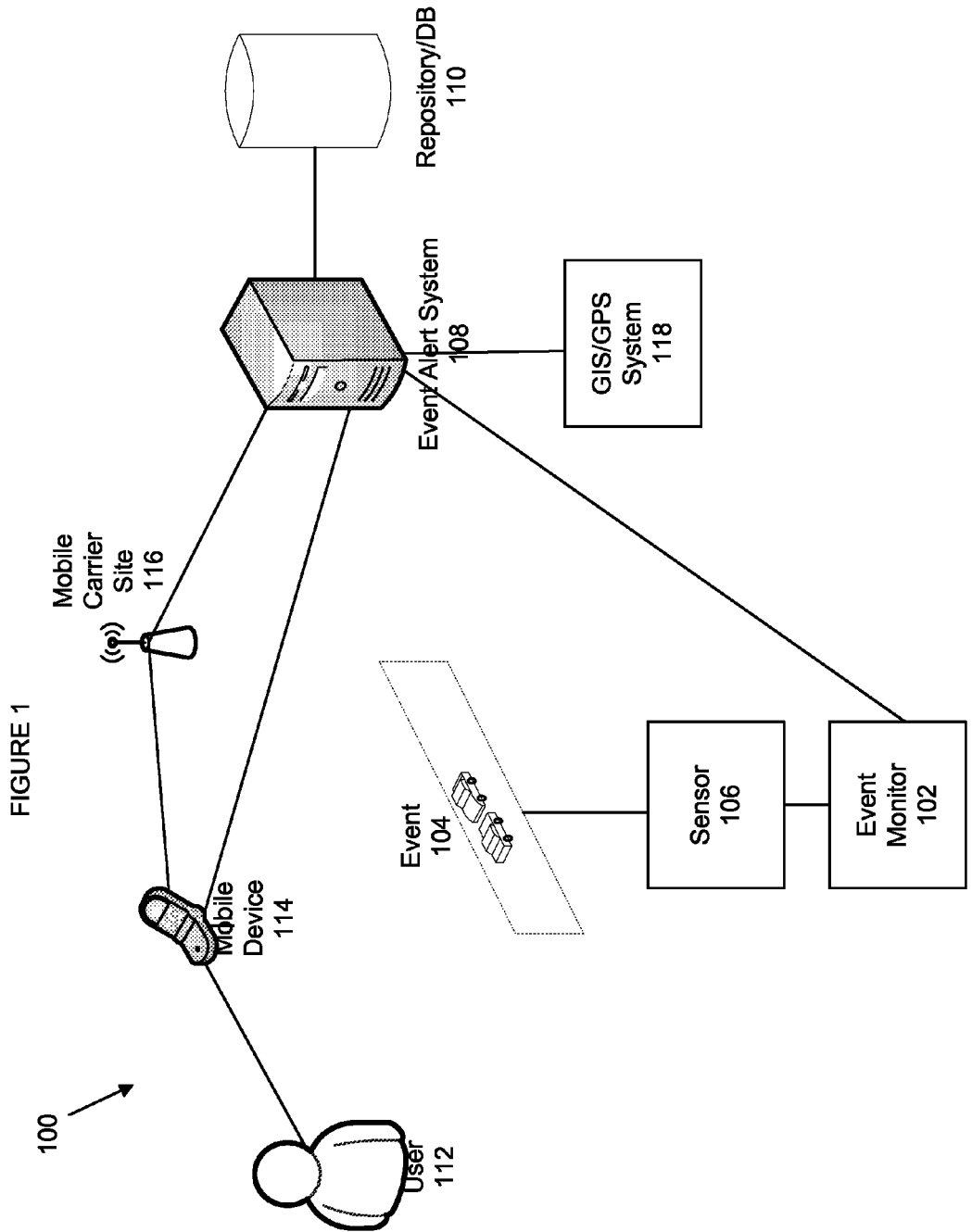
FIG. 1 depicts one illustrative embodiment of a communications network for providing information to mobile device based on an event at a geographical location.

Referring now to FIG. 1, one illustrative embodiment of a communications network for providing information to mobile device based on an event at a geographical location is depicted. In communications network 100, event monitor 102 is responsible for monitoring events 104 that occur in various geographical locations. Examples of event monitors include government or municipal agencies, such as police, fire departments, public safety answering points, and the like. Examples of events being monitored include a traffic accident, a construction detour, an explosion, a fire, a police pursuit, and the like.

Event monitor 102 may recognize events 104 by using operators or sensors 106 that are installed at the various geographical locations for detecting the occurrence of events 104. Examples of events that sensors 106 may detect include earthquakes, rain storms, electricity outage, and the like. In addition to sensors 106 that are installed at various geographical locations, sensors 106 may be installed within the event monitor 102 for monitoring events that occur above a predetermined threshold. For example, sensors 106 may be installed at the event monitor 102 to detect vibrations above a predetermined threshold to alert an earthquake.

When the event monitor 102 detects or senses an event 104, the event monitor 102 notifies an event alert system 108. The event alert system 108 stores the event 104 in a repository or database 110 and determines if the event is a specific event and if the event occurs at or near a geographical location. The event alert system 108 determines whether the event is a specific event based on a type and/or location of the event.

If the event is a specific event and if the event occurs at or near a geographical location, the event alert system 108 provides information related to the event to mobile devices 114 at or near the geographical location. In one illustrative embodiment, the event alert system 108 alerts the mobile device 114 by directly sending alert messages to mobile device 114. In order to send alert messages directly to mobile device 114, the repository or database 110 may comprise information of mobile device 114 at or near the geographical location. For example, repository or database 110 may comprise a table of mobile identification numbers (MINs) associated with service provider sites 116 at or near the geographical location. A mobile identification number (MIN) uniquely identifies a mobile device in a service provider network.

While alerts may be sent to mobile device 114 at or near the geographical location, the event alert system 108 may sent alerts to mobile devices 114 that are within a certain distance of the event 104. To determine the location of mobile device within a geographical area, the event alert system 108 may consult data stored within the geographical information system (GIS) or global positioning system (GPS) 118. For example, alerts may be sent to mobile device that are within a certain number of feet, miles, or yards of the event. In this way, only mobile devices 114 that are located within a certain distance of a geographical area affected by the event 104 may be alerted. No disruptions will be caused to the other devices.

In an alternative embodiment, the event alert system 108 may alert the mobile device 114 by sending alert messages to service provider sites 116 or other systems at the geographical location or within a certain distance of the event 104. Since each service provider site 116 keeps track of its mobile device 114 with their mobile identification numbers (MINs), no mobile device information will be stored in the repository or database 110. However, to determine service provider sites located at a geographical location or within a certain distance of the event, the event alert system 108 may consult data stored within the geographical information system (GIS) or global positioning system (GPS) 118. In response to receiving alert messages from the event alert system 108, service provider sites 116 forward the alert messages to its mobile devices 114, which in turn notify their mobile users 112.

The event alert system 108 may instruct service provider sites 116 to send a specific message to a mobile device 114 based on its location and heading relative to the event. For example, service provider sites 116 may send alert message A to mobile device 114 that are moving towards the event 104. Service provider sites 116 may also send alert message B or no alert message at all to mobile device 114 that are moving away from the event 104. In order to detect mobile device's location and heading relative to the event, the event alert system 108 may consult data stored within GIS/GPS system 118. In addition, service provider sites 116 may detect the received signal strength indication (RSSI) of its mobile devices 114 and determine their locations and headings relative to the event. Alternative to a specific message, the event alert system 108 may also instruct service provider sites 116 to send a generic alert message to all associated mobile device 114 with information related to the event 104.

Figure 2:
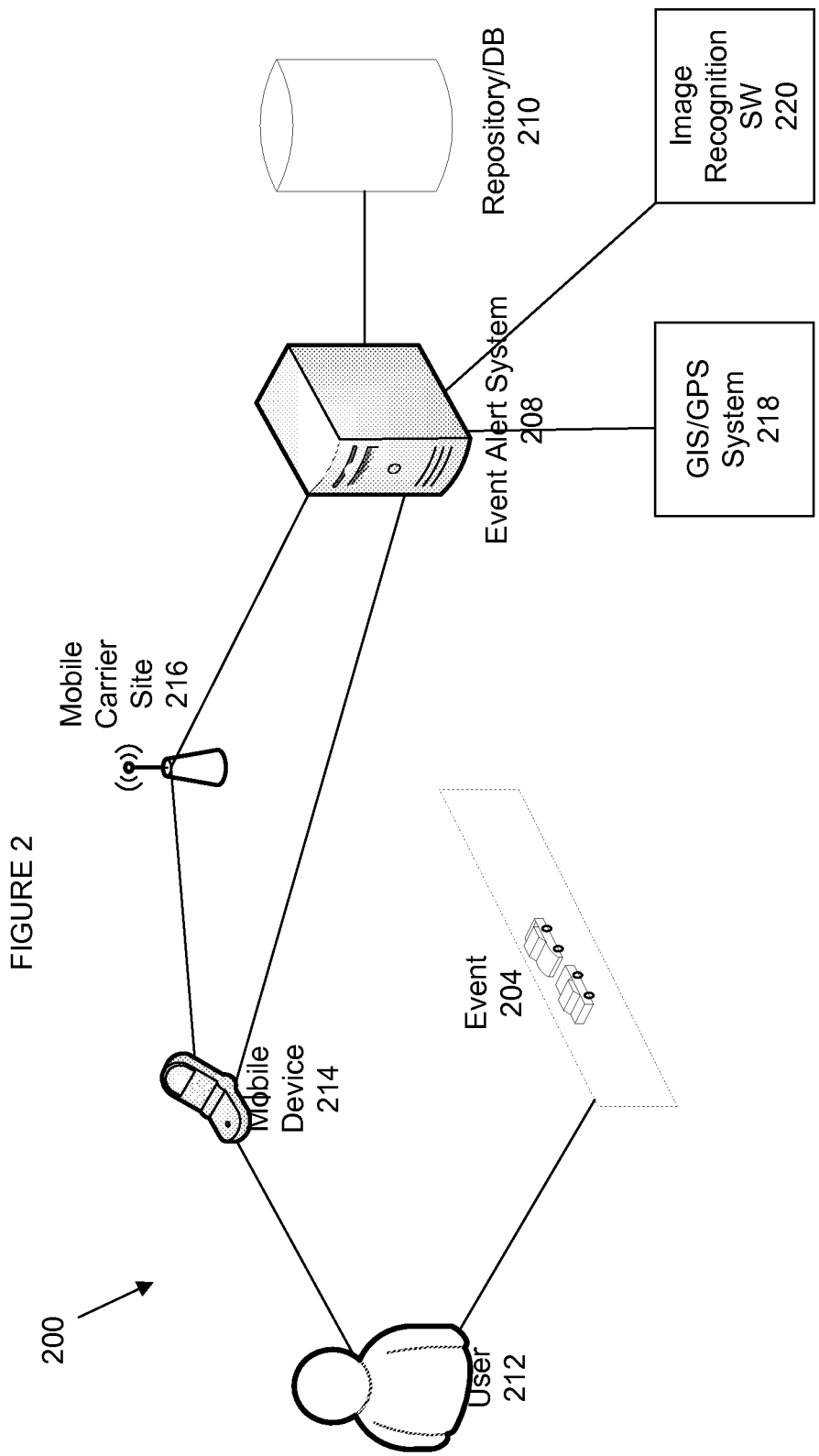
FIG. 2 depicts an alternative embodiment of a communications network for providing information to mobile device based on an event at a geographical location.

Alternative to detecting events by event monitor 102, events may be detected by the event alert system 108 from a reporting of the event originated from a person involved in the event or bystanders. FIG. 2 provides an alternative embodiment of a communications network for providing information to mobile device based on an event at a geographical location. In communications network 200, a person involved may capture information of the event 204 with mobile device 214. For example, mobile user 212 may take a picture of a scene of the accident with mobile device 214. Other examples of information captured by the mobile user 212 include videos, graphics, sounds, and the like.

Mobile user 212 may then report the event by sending the event information from mobile device 214 to the event alert system 208 via service provider sites 216. In response to receiving the event information, the event alert system 208 stores the event information in repository or database 210. Based on the event information, the event alert system 208 may utilize the GIS/GPS system 218 and image recognition software 220 to identify the location and/or the type of the event 204. The location, the type or a combination of the location and type of the event identifies the event as a specific event. The event alert system 208 then sends alert messages directly to mobile devices 214 at the geographical location or within a certain distance of the event 204. Alternatively, the event alert system 208 may send alert messages to service provider sites 216 at or near the geographical location or within a certain distance of the event 204. In response to receiving alert messages from the event alert system 108, service provider sites 216 may forward the alert messages to associated mobile devices 214, which in turn notify their mobile users 212.

Figure 3:
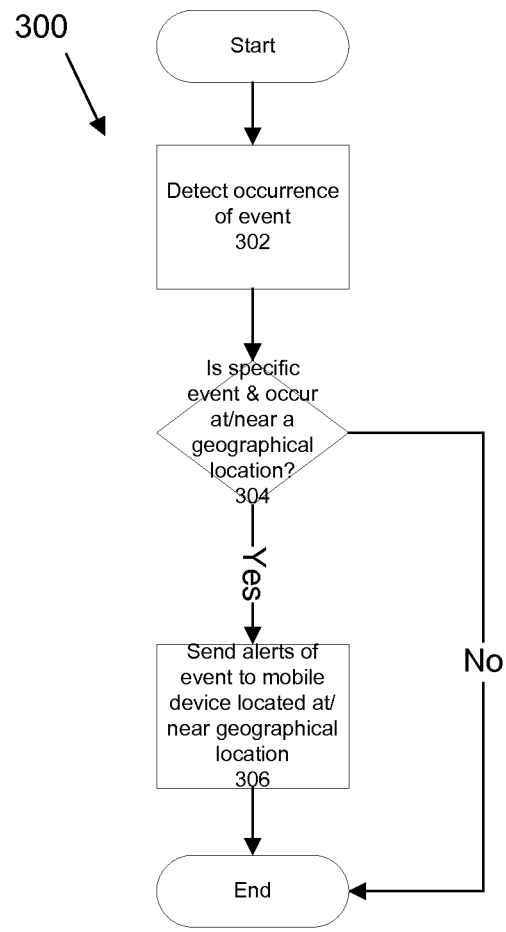
FIG. 3 depicts a flowchart of a method for providing information to mobile device based on an event at a geographical location.

FIG. 3 provides a flowchart of a method for providing information to mobile device based on an event at a geographical location. Process 300 begins at step 302 with detecting occurrence of an event. In one embodiment, the event may be detected using sensors. Alternatively, a person involved or bystanders may report an event by capturing event information with mobile devices. Next, the process continues to step 304 to determine if the event is a specific event, if the event occurs at or near a geographical location. The process then completes at step 306 to send alert messages either directly or indirectly to mobile devices if the event is a specific event, if the event occurs at or near a geographical location, and if the mobile device is at or near the geographical location.

Figure 4:
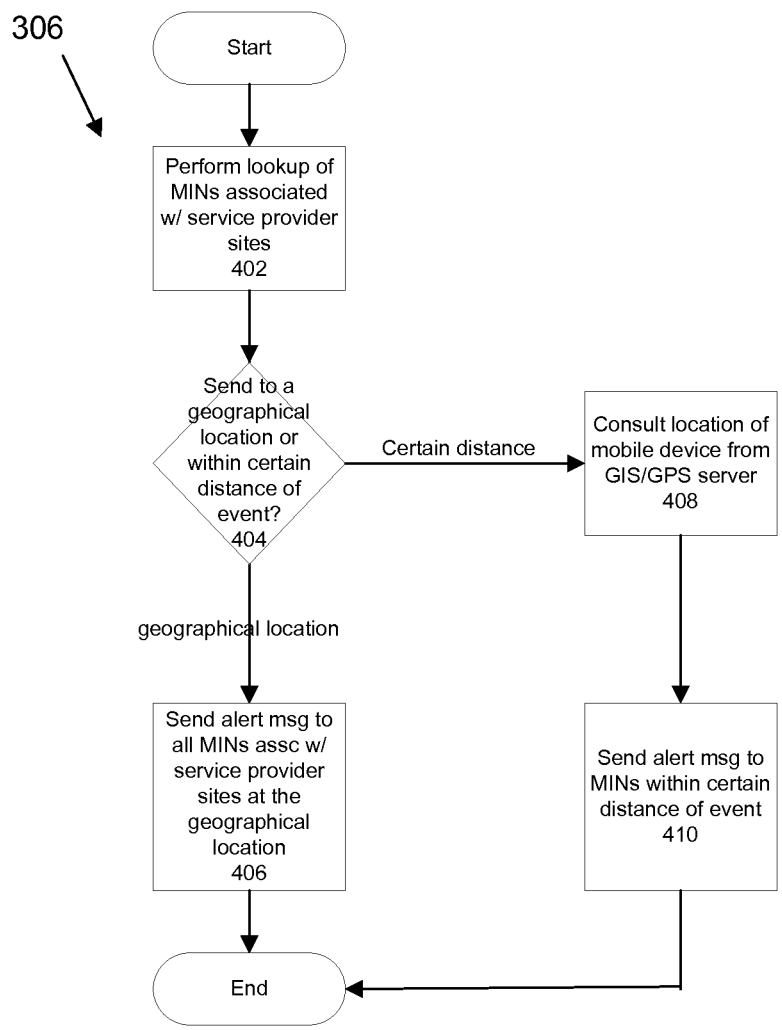
FIG. 4 depicts a flowchart of one exemplary method for sending alert messages directly to mobile devices.

FIG. 4 provides a flowchart of one exemplary method for sending alert messages directly to mobile devices. The process 306 begins at step 402 with performing a lookup of mobile devices associated with service provider sites based on their mobile identification numbers (MINs). In this example, the lookup may be performed at the service provider sites. Next, the process continues step 404 to determine whether alert messages should be sent to all mobile device at a geographical location or within a certain distance of the event.

If alert messages are to be sent to mobile devices at a geographical location, the process continues to step 406 to send alert messages to MINs associated with service provider sites at the geographical location. However, if alert messages are to be sent to mobile devices within a certain distance of the event, the process continues to step 408 to consult locations of mobile devices from data stored within a GIS/GPS server and completes at step 410 to send alert messages to MINs within a certain distance of the event.

Figure 5:
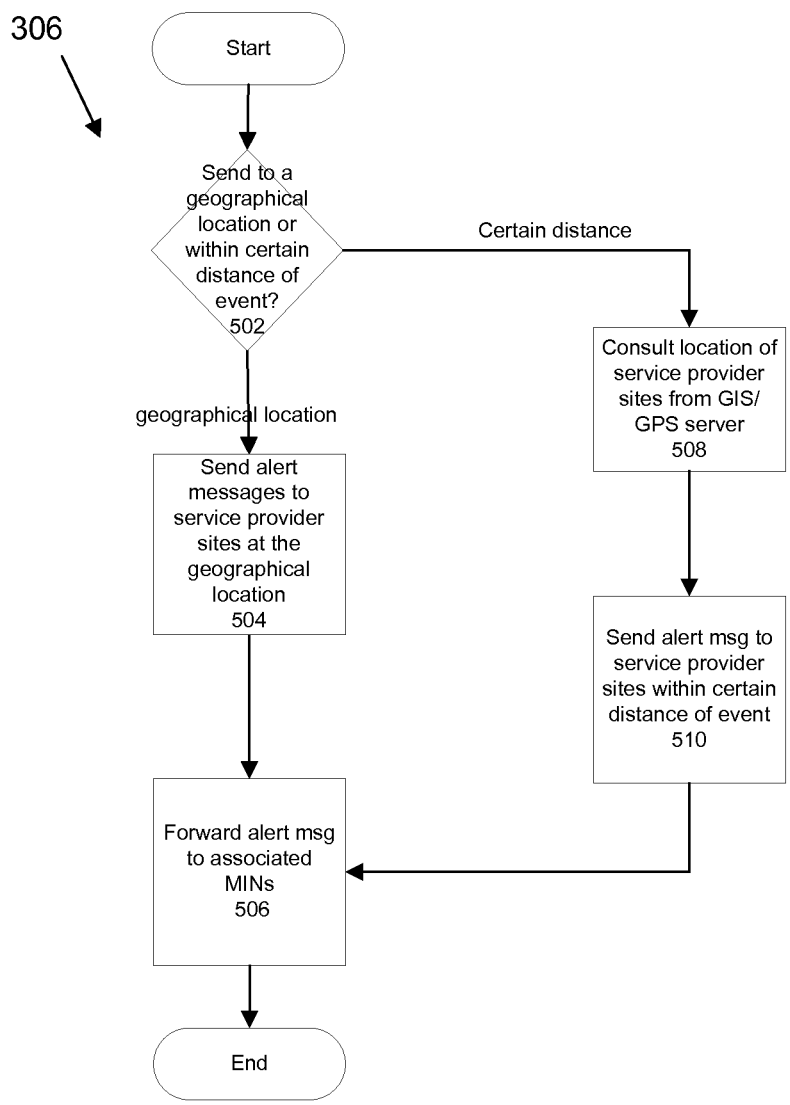
FIG. 5 depicts a flowchart of one exemplary method for indirectly sending alert messages to mobile devices.

FIG. 5 provides a flowchart of one exemplary method for indirectly sending alert messages to mobile devices. Process 306 begins with step 502 with determining whether alert messages should be sent to all mobile devices at a geographical location or within a certain distance of the event. If alert messages are to be sent to all mobile devices at a geographical location, the process continues to step 504 to send alert messages to service provider sites that are located at the geographical location. Subsequently, the process continues to step 506 to forward alert messages to MINs associated with the service provider sites.

However, if alert messages are to be sent to all mobile devices within a certain distance of the event, the process continues to step 508 to consult locations of service provider sites from data stored within a GIS/GPS server and to step 510 to forward alert messages to service provider sites that are within a certain distance of the event. The process 306 then completes at step 506 to forward alert messages to MINs associated with the service provider sites located within a certain distance of the event.

Figure 6:
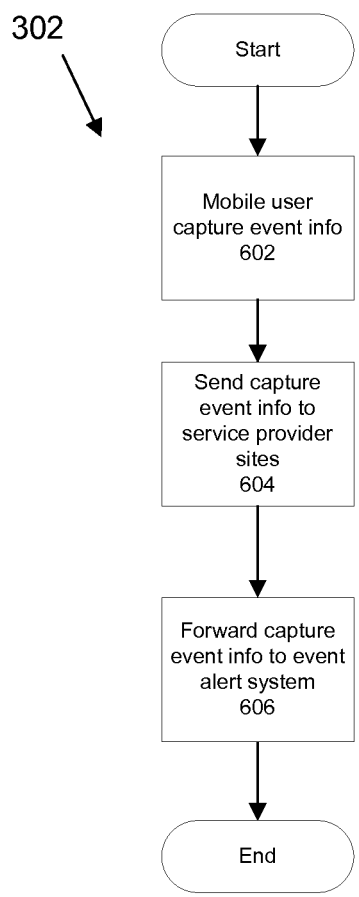
FIG. 6 depicts a flowchart of an exemplary method for detecting the event from a mobile device.

As discussed above, instead of using sensors to detect occurrence of events, a person involved or bystanders may report event information using their mobile devices. FIG. 6 provides a flowchart of an exemplary method for detecting the event from a mobile device. The process 302 begins at step 602 with a mobile user capturing information of the event with a mobile device. Next, the process 302 continues to step 604 to send the captured event information from a mobile device to a service provider site. The process 302 then completes at step 606 to forward the captured event information from the service provider site to the event alert system. Once the captured event information is received, the event alert system may store and process the information in a repository or database.

Figure 7:
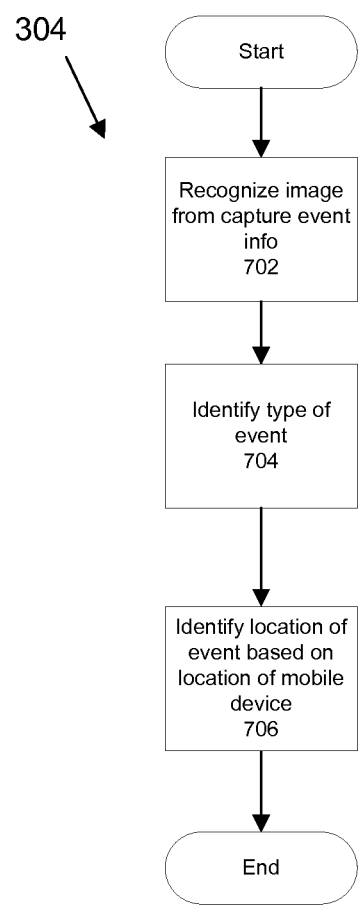
FIG. 7 depicts a flowchart of one exemplary method for processing the information in a repository or database.

FIG. 7 provides a flowchart of one exemplary method for processing the information related to the event in a repository or database. The process 304 begins at step 702 with recognizing an image from the captured event information. To accomplish this step, the captured event information may be compared to images stored within an image recognition software system. For example, the scene of an accident may be recognized by the image recognition software by comparing it to images of intersections stored within the image recognition software system.

Next, the process 304 continues to step 704 to identify a type of the event based on the recognized image. To accomplish this step, the information from the captured image may be compared to information stored within the repository or database. For example, the accident scene image recognized by the software may be compared to information stored within the repository or database and an accident event is identified. After the type of event is identified, the process 304 continues to step 706 to identify location of the event based on the location of the mobile device reporting the event or a recognized image. To accomplish this step, the event alert system may consult data stored within a GIS/GPS server. Based on the type, the location, or a combination of the type and location of the event, alert messages may be sent to mobile devices that are at or near the geographical location.

In addition to alerting events to mobile devices based on geographical location, alert messages may be sent based on time periods spent by mobile users in a particular geographical location. For example, alert messages may be sent only to mobile devices that have passed through or are registered with a service provider site within a certain period of time. Examples of periods of time include months, weeks, days, hours, minutes, and the like. In this way, alerts may be sent to mobile devices that are within the reach of a service provider site for a specific period of time. For example, if an accident occurred in a particular geographical location half an hour ago, alert messages may be sent to mobile device that have passed through or are registered with a service provider site located within a certain distance of the event for the past half hour, such that mobile users in the vicinity of the accident may take preventative action to avoid the scene. In order to identify mobile devices based on a period of time, it is preferable to store mobile identification numbers (MINs) associated with each service provider site for a period of time in the service provider site, a repository, or a database.

It is noted that the alert messages being sent to the mobile devices may include information related to the event in a form of text, voice, sound, graphics, email, short messages, and the like. In the event that a short message alert is sent, the message may be sent via a short message servicing center. In addition to text alerts, alert messages may include additional information about the event. For example, the alert message may include a link to obtain further information related to the event, a link to a map surrounding the location of the event, a suggestion of alternate route, etc. Furthermore, additional information about the event may include instructions from government agencies indicating precautions to take against the event. For example, the Homeland Security Department may send out information about the procedures for dealing with nuclear, biological, and chemical events.

Moreover, different types of alert messages may be sent based on the type of events that occurred. For example, short message type 1 (SMS1) may be sent for a general event, while short message type 2 (SMS2) may be sent for a more serious event. In addition, one or more types of messages may be sent simultaneously to a mobile device based on the type of events. For example, in an event of abduction, a text containing a license number and description of the abductor may be sent simultaneously with a picture of the abductee and a map of the abduction location.

Figure 8:
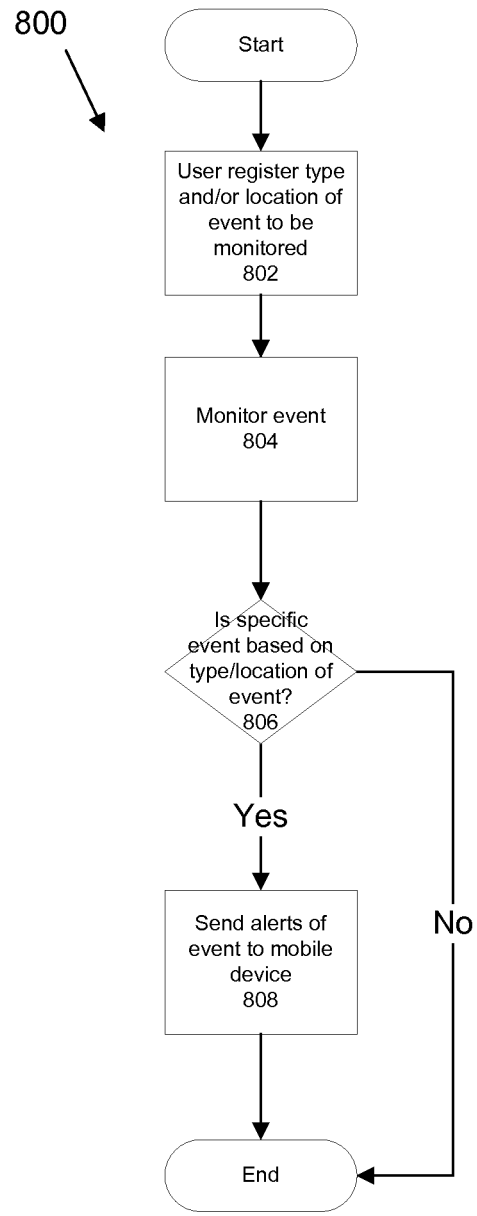
FIG. 8 depicts a flowchart of an exemplary method for providing information to a mobile device which initiated event monitoring.

In addition to initiating event monitoring by an event monitor or a person involved in the event, mobile users may register for monitoring of events and delivery of alert messages when the events occur. FIG. 8 provides a flowchart of an exemplary method for providing information to mobile device who initiated event monitoring. Process 800 begins at step 802 with a mobile user registering a location and/or type of event to be monitored. For example, a mobile user may register to monitor for a traffic accident at a particular intersection.

Next, process 800 continues to step 804 to monitor for the specific event. Process 800 continues to step 806 to determine if the event is a specific event based on the type and/or location of the event detected. This step may be accomplished by utilizing the GIS/GPS system and image recognition software. If the event is the specific event based on the location and/or type of the event detected, process 800 continues to step 808 to send messages alerting the event either directly or indirectly to the mobile device of the registered user. Otherwise, the process terminates thereafter.

In summary, aspects of the present disclosure provide a method and system for providing information to mobile device based on an event at a geographical location. Events may be detected from sensors or reporting of the event by a person. Also, a mobile user may register and initiate event monitoring. Alerting of the events may be performed directly or indirectly. Alert messages may be sent directly to mobile devices that are associated with service provider sites in various geographical locations. Alert messages may also be sent first to the service provider sites or other systems, which then forward the messages to associated mobile devices. Event information may be stored in a repository or database or within the service provider sites. Aspects of present disclosure may utilize image recognition software and GIS/GPS servers to identify a location and a type of the event, such that a determination can be made as to whether the event is a specific event. In this way, alert messages may be sent to specific mobile devices at or near the geographical location of the event.

Systems and methods have been shown and/or described in the above embodiments for alerting events to mobile users based on geographical locations. Although the above descriptions set forth preferred embodiments, it will be understood that there is no intent to limit the invention by such disclosure, but rather, it is intended to cover all modifications and alternate implementations falling within the spirit and scope of the invention. Furthermore, the embodiments are intended to cover capabilities and concepts whether they be via a loosely coupled set of components or they be converged into one or more integrated components, devices, circuits, and/or software programs.

What is claimed is:

1. A method, comprising:
    capturing information about an event, that has occurred above a predetermined threshold, by at least one mobile device, the information comprising location information and event type information;
    sending the information from the at least one mobile device to an event alert server;
    identifying the event via the event alert server based on the information, the event being identified by associating the event type information with a specific event and associating the location information with a location associated with the specific event;
    performing a lookup of at least one other mobile device associated with at least one service provider site;
    identifying a location of the at least one other mobile device; and
    sending an alert of the event to the at least one other mobile device if the at least one other mobile device is within a predetermined distance of the event based on the location associated with the specific event;
    wherein the sending of the alert comprises sending at least one of:
        a first alert to a first mobile device of the at least one other mobile device moving towards the event; and
        a second alert to a second mobile device of the at least one other mobile device moving away from the event.

2. The method of claim 1, comprising receiving an alert of the event at the least one other mobile device if at least one of a following occurs:
    the event is the specific event;
    the event occurs at or near the geographical location; and
    the at least one other mobile device is located at or near the geographical location.

3. The method of claim 1, wherein at least one of:
    determining if the event is a specific event; and
    if the event occurred at or near a geographical location, comprises at least one of:
    processing information related to the event, wherein the processing comprises:
    recognizing an image from the information about the event;
    identifying the type of the event based on the image; and
    identifying the location of the event based on the location of the at least one mobile device.

4. The method of claim 1, comprising sending an alert of the event to the at least one other mobile device comprises at least one of:
    performing a lookup of the at least one other mobile device associated with at least one service provider site; and
    sending the alert to the at least one other mobile device associated with at least one service provider site.

5. The method of claim 1, comprising sending an alert of the event to the at least one other mobile device comprises at least one of:
    sending the alert to at least one service provider site; and
    forwarding the alert from the at least one service provider site to the at least one other mobile device associated with the at least one service provider site.

6. The method of claim 1, comprising sending an alert of the event to the at least one other mobile device comprises at least one of:
    identifying a location of at least one service provider site from a geographical information system;
    sending the alert to the at least one service provider site within a predetermined distance of the event based on the location; and
    forwarding the alert from the at least one service provider site to the at least one other mobile device associated with the at least one service provider site.

7. The method of claim 1,
    wherein at least one of the first mobile device and the second mobile device is the at least one mobile device.

8. The method of claim 1, comprising sending an alert of the event to the at least one other mobile device comprises sending the alert to the at least one other mobile device based on a period of time the at least one other mobile device is registered with a service provider site.

9. A non-transitory computer readable storage medium comprising instructions that when executed by a processor cause the processor to perform:
    capturing information about an event, that has occurred above a predetermined threshold, by at least one mobile device, the information comprising location information and event type information;

sending the information from the at least one mobile device to an event alert server;

identifying the event via the event alert server based on the information, the event being identified by associating the event type information with a specific event and associating the location information with a location associated with the specific event;

performing a lookup of at least one other mobile device associated with at least one service provider site;

identifying a location of the at least one other mobile device; and sending an alert of the event to the at least one other mobile device if the at least one other mobile device is within a predetermined distance of the event based on the location associated with the specific event;

wherein the sending of the alert comprises sending at least one of:
  a first alert to a first mobile device of the at least one other mobile device moving towards the event; and
  a second alert to a second mobile device of the at least one other mobile device moving away from the event.

10. A system, comprising:
an event alert system configured to:
  receive information about an event, that has occurred above a predetermined threshold, from at least one mobile device, the information comprising location information and event type information;
  identify the event based on the information, the event being identified by an association of the event type information with a specific event stored in the repository and an association of the location information with a particular location associated with the specific event;
  perform a lookup of at least one other mobile device associated with at least one service provider site;
  receive a location of the at least one other mobile device; and
  send an alert of the event to the at least one other mobile device if the at least one other mobile device is within a predetermined distance of the event based on the location associated with the specific event;
  wherein the alert sent comprises at least one of:
    a first alert sent to a first mobile device of the at least one other mobile device moving towards the event; and
    a second alert sent to a second mobile device of the at least one other mobile device moving away from the event.

11. The system of claim 10, further comprising at least one event monitor operable to perform at least one of a following:
sense an occurrence of the event;
determine if the event is above the predetermined threshold; and
notify the event alert system of the occurrence of the event if the event is above the predetermined threshold.

12. The system of claim 10, wherein the event alert system is further operable to perform at least one of a following:
send the alert to at least one service provider site; and
cause the at least one service provider site to forward the alert from the at least one service provider site to the at least one other mobile device associated with the at least one service provider site.

13. The system of claim 10, wherein information about the event is received if at least one of the following occurs:
the event is the specific event;
the event occurs at or near the geographical location; and
the at least one mobile device is located at or near the geographical location.

14. The system of claim 10, further comprising at least one geographical information system, wherein
the at least one geographical information system sends the location of the at least one other mobile device.

15. The system of claim 10, further comprising at least one geographical information system, wherein the event alert system is further operable to perform at least one of a following:
identify a location of at least one service provider site from the at least one geographical information system;
send the alert to the at least one service provider site within a predetermined distance of the event based on the location; and
forward the alert from the at least one service provider site to at least one of: the at least one mobile device associated with the at least one service provider site and the at least one other mobile device.

16. The system of claim 10, further comprising:
at least one image recognition system; and
at least one geographical information system;
wherein the at least one image recognition system is operable to recognize an image from the information about the event;
wherein the event alert system is operable to identify at least one of:
  a type of the event based on the image; and
  a location of the event based on a location of the at least one mobile device from the at least one geographical information system.

17. The system of claim 10, wherein the event alert system is further operable to perform at least one of a following:
register at least one mobile user associated with the at least one mobile device;
monitor a specific event;
determine if the monitored event is the specific event based on a type of the event and a location of the event; and
send an alert of the event, if the event is the specific event, to at least one of: the at least one mobile device and the at least one other mobile device.

* * * * *